Feb. 14, 1956 W. H. ARMACOST Re. 24,119
METHOD OF SUPERHEAT CONTROL
Original Filed Aug. 9, 1945
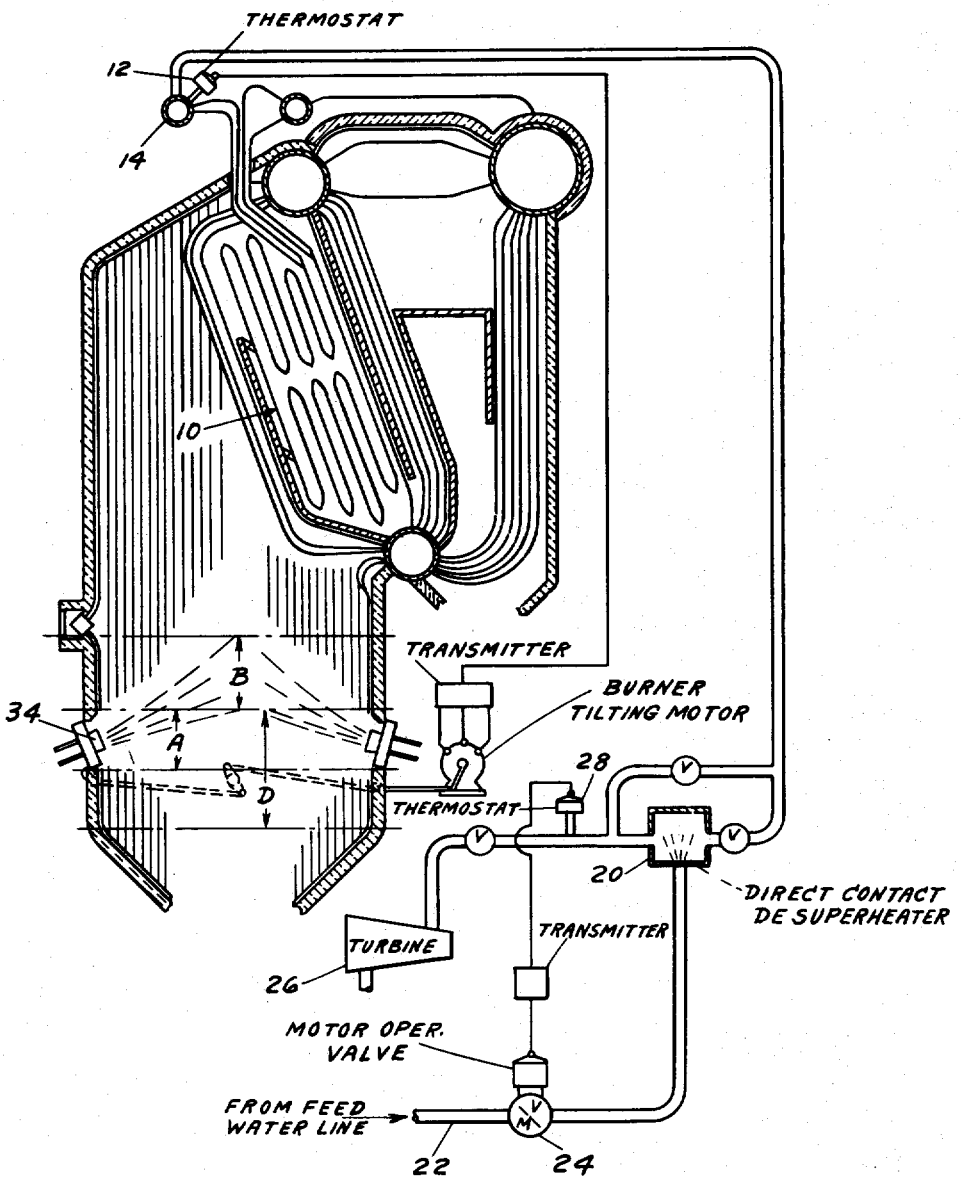
WILBUR H. ARMACOST
INVENTOR.
BY James J. Whalen
ATTORNEY United States Patent Office Re. 24,119

Reissued Feb. 14, 1956

24,119

METHOD OF SUPERHEAT CONTROL

Wilbur H. Armacost, Scarsdale, N. Y., assignor to Combustion Engineering Inc., New York, N. Y., a corporation of Delaware Original No. 2,640,468, dated June 2, 1953, Serial No. 609,956, August 9, 1945. Application for reissue March 22, 1955, Serial No. 496,091

2 Claims. (Cl. 122—479)

Matter enclosed in heavy brackets [ ] appears in the original patent but forms no part of this reissue specification; matter printed in italics indicates the additions made by reissue.

The present invention relates to superheaters and particularly to improved methods of controlling the final temperature of superheated steam in generators of high capacity.

The single figure in the drawing is a schematic view of a power plant including a steam generating boiler in which the temperature of superheated steam is controlled in accordance with the present invention by effecting the major control through burner adjustment to effect the major regulation by varying the temperature of the products of combustion passing over the superheater with the final regulation being attained through a desuperheating action.

The use of tiltable burners alone for the control of steam temperature has not been entirely satisfactory. The principle of the tiltable burner is to regulate the temperature of hot gases over the superheater surface, and thereby control the heat which is transferred from the gas to the steam so as to obtain the steam temperature desired.

There is one outstanding disadvantage in the use of tiltable burners which cannot be corrected by design, and that is the sluggishness in the response. It is not so much a question of adequate response of the control equipment and the burner tilting mechanism, but is due rather to the inertia in changing the temperature of the large mass of metal embodied in the superheater units 10. In the case of automatic control the thermocouple 12 which is affected by the steam temperature leaving the superheater outlet header 14 calls for a change in the setting of the burners 34. On some installations, it takes less than a minute to change the angle of burner tilt, but a period of fifteen minutes or more is required to effect a change in steam temperature because the residual heat in the large mass of the superheater keeps raising the temperature above the desired point until a sufficient volume of steam has flowed through to carry off the residual heat. A reduction in load may be followed by lowering the temperature of the gases through tilting the burners 34 but even the lower gas temperature tends to keep the steam temperature up and even cause it to rise due to the action of the residual heat of the superheater metal on a smaller steam volume. The phenomenon is inherent in the design of tiltable burner control of steam temperature, and is due to the large mass of the superheater 10. The mass of the superheater cannot be reduced and the present trend in design is to increase it. By the time burner tilting effects the desired change in steam temperature, the need for a change if due to load variations, etc., often has passed.

Tiltable burners do have the advantage of effecting relatively large changes in steam temperature at an economical cost. The invention therefore contemplates retaining the advantages of a tilting burner type of steam temperature control and the use of additional controls to offset the disadvantage of sluggishness to effect a major part of the regulation in steam temperature, and achieve the final regulation by other controls.

*In boilers equipped with tilting burners regulation is effected by tilting the furnace burners vertically to vary the vertical position A, B, or D of the combustion zone with respect to water walls or by adjusting burners horizontally to change the size and location of the combustion zone by altering the size of a circle toward which the flames are directed tangentially and thus in either case to vary the degree of cooling of the gases by the furnace walls prior to reaching the superheater. Such control arrangements are more fully disclosed in Kreisinger et al. Patent 2,363,785, issued November 28, 1944, and Kruger Patent 2,243,909, issued June 3, 1941, respectively. For installations in which the water available for desuperheating is not of good quality, a small non-contact desuperheater may be used. With such installations the major amount of control may be effected by adjustment of the burners 34 and the final 15 degrees to 25 degrees by passing part of the steam through the desuperheater 20.*

*A valve 24 in line 22 supplied with feed water is operable in response to the fluctuations in steam temperature at or near the turbine 26 as reflected by a thermostat 28.*

*The part of the steam withdrawn would be passed through the desuperheater and its temperature reduced to a point so that when returned and mixed with the main steam flow the resultant steam temperature will be that desired.*

The quickest acting control is a spray desuperheater 20 located beyond the superheater outlet 14. Such a spray would be designed to give a range of control of about 15 degrees to 25 degrees F. at maximum load on the boiler. The water used for desuperheating would be drawn from the feed water heater or feed water itself, if of sufficient purity. [A valve 24 in the feed water line 22 is operable in response to the fluctuations in steam temperature at or near the turbine 26 as reflected by a thermostat 28.] By proper manipulation the steam temperature at the turbine or engine can be maintained within 2 degrees F. of the desired temperature. By limiting the range of auxiliary desuperheater control to the final 15 degrees to 25 degrees F. of regulation the percentage of water used for this purpose is kept to a minimum.

For installations in which the water available for desuperheating is not of good quality, a small non-contact desuperheater may be used which would be placed in one of the boiler drums. It is possible to design such a desuperheater which can be installed assembled through a standard manhole opening, and which will have maximum range of control of 15 degrees to 25 degrees F. With such a design the heat removed from the superheated steam would be transmitted through the tubes of the desuperheater into the boiler water. The reaction in response to a change in steam temperature would be many times faster than the reaction obtained solely with tilting burner control in that a considerably less mass of metal would be affected. The response would not be quite as fast as in the case of the spray type of desuperheater.

The small non-contact type of desuperheater would be connected so as to withdraw part of the superheated steam from the outlet header 14. In this respect the connection can be made at the blank end of the outlet header, thereby requiring a slightly smaller outlet header. [The part of steam withdrawn would be passed through the desuperheater and its temperature reduced to a point so that when returned and mixed with the main steam flow the resultant steam temperature will be that desired.]

[In boilers equipped with tilting burners regulation is effected by tilting the furnace burners vertically to vary the vertical position A, B, or D of the combustion zone with respect to water walls or by adjusting burners horizontally to change the size and location of the combustion zone by altering the size of a circle toward which the flames are directed tangentially and thus in either case to vary the degree of cooling of the gases by the furnace walls prior to reaching the superheater. Such control arrangements are more fully disclosed in Kreisinger et al. Patent 2,363,785 issued November 28, 1944, and Kruger Patent 2,243,909, issued June 3, 1941, respectively. With such installations the major amount of control may be effected by adjustment of the burners 34 and the final 15 degrees to 25 degrees by passing part of the steam through the desuperheater 30.]

What I claim is:

1. The method of maintaining superheated steam temperature in a steam generator in which the major portion of the steam is produced in a vertical furnace lined with steam generating elements exposed to radiant heat from burning fuel and which generators have superheaters of relatively large heat storage capacity, due to the metallic mass thereof, sufficient to cause a substantial time lag in the change of steam temperature when the volume and temperature of heating gases passing over the superheater decrease with the fuel burning rate upon a fall in steam demand, which comprises: introducing fuel and air into the furnace in such directions so as to create a turbulent gas mass in a zone remote from the furnace outlet; burning said fuel at a rate in accordance with steam demand and absorbing the radiant heat therefrom in the steam generating elements to produce steam to be superheated; passing the steam so generated through the superheater to increase its temperature; controllably altering the angle of introduction of fuel and air to the furnace to lower the zone of combustion with respect to the steam generating elements that absorb radiant heat so as to increase said absorption and reduce the temperature of gases passing over the superheater to compensate for only the major part of increases above a predetermined value of steam temperature leaving the superheater; and simultaneously subjecting all or part of the superheated steam to a desuperheating action so as to promptly offset the overheating of all of the steam, during said lag, due to said heat storage in the superheater metal to effect minor adjustments of steam temperature during a change in load thereby maintaining a substantially constant final steam temperature.

2. The method of maintaining final temperature of steam in a superheater receiving its heat mainly by convection from gases leaving a furnace provided with water cooled tubes in which the major portion of the steam is produced by radiant absorption of heat from fuel burned in the furnace and which generators have superheaters of relatively large heat storage capacity sufficient to cause a substantial time lag, due to the metallic mass thereof, in the change of steam temperature when the volume and temperature of the heating gases passing over said superheater changes with increase or decrease of the fuel burning rate upon change in steam demand, which comprises: introducing fuel and air into the furnace in such directions as to create a turbulent gas mass in a zone remote from the furnace outlet; burning said fuel at a rate in accordance with steam demand and absorbing radiant heat therefrom in the steam generating elements to produce steam to be superheated; passing steam so generated through the superheater to increase its temperature; controllably altering the angle of introduction of fuel and air into the furnace so as to shift the zone of combustion toward or away from the furnace outlet so as to decrease or increase, respectively, the absorption of radiant heat in said steam generating elements and thereby increase and reduce, respectively, the temperature of heating gases passing over the superheater and thus compensate for only the major part of variations from a predetermined value of the steam temperature leaving the superheater; and subjecting all or part of the superheated steam to a desuperheating action for promptly offsetting the overheating of all of the steam, during said lag, due to said heat storage in the superheater metal so as to effect minor adjustments of steam temperature occurring as a result of increasing and decreasing the temperature of the gases passing over the superheater thereby maintaining a substantially constant final steam temperature.

References Cited in the file of this patent or the original patent

UNITED STATES PATENTS

| | | |
|---|---|---|
| 2,363,875 | Kreisinger et al. | Nov. 28, 1944 |

FOREIGN PATENTS

| | | |
|---|---|---|
| 409,275 | Germany | Feb. 3, 1925 |
| 437,534 | Germany | Nov. 24, 1926 |
| 482,901 | Great Britain | Apr. 7, 1938 |